United States Patent
Ponnekanti

(10) Patent No.: US 6,493,701 B2
(45) Date of Patent: Dec. 10, 2002

(54) DATABASE SYSTEM WITH METHODOGY PROVIDING FASTER N-ARY NESTED LOOP JOINS

(75) Inventor: Nagavamsi Ponnekanti, Emeryville, CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/900,003

(22) Filed: Jul. 5, 2001

(65) Prior Publication Data

US 2002/0078015 A1 Jun. 20, 2002

Related U.S. Application Data

(60) Provisional application No. 60/252,758, filed on Nov. 22, 2000.

(51) Int. Cl.$^7$ .............................................. G06F 17/30
(52) U.S. Cl. ...................... 707/2; 707/5; 707/3; 707/4
(58) Field of Search ............................. 707/1, 2, 3, 4, 707/5, 10, 100, 101; 706/45

(56) References Cited

U.S. PATENT DOCUMENTS

| | | | | |
|---|---|---|---|---|
| 5,590,324 A | * | 12/1996 | Leung et al. ................... | 707/5 |
| 5,600,831 A | * | 2/1997 | Levy et al. ..................... | 706/45 |
| 5,991,754 A | * | 11/1999 | Raitto et al. .................... | 707/2 |
| 6,134,546 A | * | 10/2000 | Bestgen et al. ............. | 707/101 |
| 6,374,235 B1 | * | 4/2002 | Chen et al. ..................... | 707/2 |
| 6,397,204 B1 | * | 5/2002 | Liu et al. ........................ | 707/2 |

OTHER PUBLICATIONS

Graefe, Goetz et al., Hash Joins and Hash Teams in Microsoft SQL Server, VLDB 1998, pp. 86–97, 1998.
Chen, Ming–Syan et al., On Applying Hash Filters to Improving the Execution of Multi–Join Queries, VLDB Journal 6(2), pp. 121–131, 1997.
O'Neil, Patrick E. et al., Multi–Table Joins Through Bit-mapped Join Indices, Sigmod Record 24(3), pp. 8–11, 1995.
Dewitt, David J. et al., Nested Loops Revisited, PDIS 1993, pp. 230–242, 1993.
Roussopoulos, Nick et al., A Pipeline N–way Join Algorithm Based on the 2–way Semijoin Program, IEEE Transactions on Knowledge and Data Engineering, vol. 3, No. 4, Dec. 1991.
Shapiro, Leonard D. et al., Join Processing in Database Systems with Large Main Memories, TODS 11(3), pp. 239–264, 1986.
Selinger, Patricia G. et al., Access Path Selection in a Relational Database Management System, ACM Sigmod Conference 1979, pp. 23–34, 1979.

* cited by examiner

Primary Examiner—Diane D. Mizrahi
Assistant Examiner—Yicun Wu
(74) Attorney, Agent, or Firm—John A. Smart

(57) ABSTRACT

A database system implementing a methodology or technique that can be used to optimize processing of nested loop joins of three or more tables (n-ary NLJs for n>2) more efficiently is described. In implementation, upon encountering a failure condition (i.e., a given join condition does not hold true) from a join operator (scan child), context information (about the failure) is returned (to the n-ary nested-loop join operator) for indicating exactly which condition (i.e., join condition) failed. This information is tracked in a scan descriptor, which includes a "fail sarg" data field indicating exactly which particular search argument ("sarg") failed. Based on this information, the system (operating through the n-ary nested-loop join operator) knows exactly which scan child to return back to (i.e., how far back to go in the join order to fetch the next row). In this manner, the methodology optimizes processing of n-ary nested loop joins by eliminating comparisons that will not hold true for the corresponding join condition (for which the comparisons were to be tested).

18 Claims, 9 Drawing Sheets

```
         T1                    T2                   T3
   C1    C5              C2                    C3    C4
   ┌──┬──┬──┬──┐       ┌──┬──┬──┬──┐         ┌──┬──┬──┬──┐
   │1 │3 │  │  │       │1 │  │  │  │         │1 │2 │  │  │
   │  │  │  │  │       │  │  │  │  │         │  │  │  │  │
   │  │  │  │  │       │  │  │  │  │         │  │  │  │  │
   │  │  │  │  │       │  │  │  │  │         │  │  │  │  │
   └──┴──┴──┴──┘       └──┴──┴──┴──┘         └──┴──┴──┴──┘

SELECT ... FROM T1, T2
             WHERE T1.C1 = T2.C2

SELECT ... FROM T1, T2, T3
             WHERE T1.C1 = T2.C2
             AND T2.C2 = T3.C3
             AND T1.C5 = T3.C4
```

*FIG. 4*

DATABASE SYSTEM WITH METHODOGY PROVIDING FASTER N-ARY NESTED LOOP JOINS

RELATED APPLICATIONS

The present application is related to, and claims the benefit of priority of, the following commonly-owned provisional application(s): application Ser. No. 60/252,758 (Docket No. SYB/0073.00), filed on Nov. 22, 2000, entitled "Database System with Methodogy Providing Faster N-ary Nested Loop Joins," of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing environments and, more particularly, to join operations in a data processing system, such as a Database Management System (DBMS).

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., "An Introduction to Database Systems," Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft® clients connected to one or more Sybase( Adaptive Server® database servers. Both Powersoft® and Sybase® Adaptive Server® (formerly Sybase® SQL Server®) are available from Sybase, Inc. of Emeryville, Calif.

"Join" is a common operation in an RDBMS. Nested Loop Join (NLJ), sort merge join, and hash join are the three well-known join methods. Optimization and execution of queries involving joins have been extensively discussed in the literature. See, e.g., Selinger, Patricia G., et. al., "Access Path Selection in a Relational Database Management System," ACM SIGMOD Conference, pp. 23 –34, 1979 which deals with finding optimal join orders and join methods to use. See, e.g., Shapiro, Leonard D., "Join Processing in Database Systems with Large Main Memories," TODS 11(3), pp. 239 –264, 1986 and Graefe, Goetz, et. al., "Hash Joins and Hash Teams in Microsoft SQL Server," VLDB, pp. 86 –97, 1998 which deal with merge joins and hash joins. See, e.g., Chen, Ming-Syan, et. al., "On Applying Hash Filters to Improving the Execution of Multi-Join Queries," VLDB Journal 6(2), pp. 121 –131, 1997 and Roussopoulos, Nick and Kang, Hyunchul, "Pipeline N-way Join Algorithm Based on the 2 –way Semijoin" which deal with use of semijoin based approaches to process multi-join queries efficiently. See, e.g., O'Neil, Patrick E. and Graefe, Goetz, "Multi-Table Joins Through Bitmapped Join Indices," SIGMOD Record 24(3), pp. 8 –11, 1995 which deals with using bitmapped join indices to process multi-table joins more efficiently. See, e.g., Dewitt, David J., et. al., "Nested Loops Revisited," PDIS, pp. 230 –242, 1993 which deals with parallelization of joins. The disclosures of the foregoing are hereby incorporated by reference.

What is needed is a technique that can be used to process some n-ary NLJs more efficiently, for n>2, as queries with multiple joins are common in decision support and OLAP. The present invention fulfills this and other needs.

SUMMARY OF THE INVENTION

A database system implementing a methodology or technique that can be used to optimize processing of nested loop joins of three or more tables (n-ary NLJs for n>2) more efficiently is described. The methodology is straightforward to implement and has been prototyped in a commercial RDBMS.

Operation of the methodology may be summarized as follows. First, a query is received (e.g., SQL-based query from a client database application) specifying a join of three or more tables, where at least one join condition exists between an inner table (in the join order) and an outer table that is not the immediately or directly preceding table (in the join order). The join order itself specifies the particular sequence or order that tables (or index) are accessed for retrieving rows (for examination) during query execution.

Query execution proceeds as follows. A loop is established to retrieve rows from successive tables (per the join order). The method determines whether a condition is being tested (i.e., value being compared) that refers back to a more-outer table that is not a directly preceding table. Consider the following example. query:

select [. . . ] from T1, T2, T3
where T1.C1=T2.C2
and T2.C2=T3.C3
and T1.C5=T3.C4

In the example, the join condition of T1.C5=T3.C4 requires a current row under examination from the third table in the join order (i.e., Table T3) to match the join condition (equality, in that example) specified for the first table (i.e., Table T1, which is not an immediately preceding table). If that condition is not met, then query execution (method) proceeds to fetch the next row (if any) from that outer table (whose just-tested condition failed).

Otherwise (i.e., the just-tested condition succeeds), the method continues down the join order to examine any remaining/subsequent tables in the join order (if any), applying any subsequent query conditions (if any) that must be met in order to qualify for the query. In the instance that a set of rows under examination meets the query condition(s), those rows are qualified (as having met the query). If any further rows/tables remain to be .examined, the method loops back to examine those rows/tables.

In implementation, upon encountering a failure condition (i.e., a given join condition does not hold true) from a join operator (scan child), context information (about the failure) is returned (to the n-ary nested-loop join operator) for indicating exactly which condition (i.e., join condition) failed. This information is tracked in a scan descriptor, which includes a "fail sarg" data field indicating exactly which particular search argument ("sarg" ) failed. Based on this information, the system (operating through the n-ary nested-loop join operator) knows exactly which scan child to return back to (i.e., how far back to go in the join order to fetch the next row). In this manner, the methodology optimizes processing of n-ary nested loop joins by eliminating comparisons that will not hold true for the corresponding join condition (for which the comparisons were to be tested).

BRIEF DESCRIPTION OF THE DRAWINGS

FIG. 4 is a diagram of a n-ary join of two tables and the query statements that can be employed.

DETAILED DESCRIPTION OF A PREFERRED EMBODIMENT

The following description will focus on the presently-preferred embodiment of the present invention, which operates in a network environment executing client/server database applications. The present invention, however, is not limited to any particular application or environment. Instead, those skilled in the art will find that the present invention may be advantageously applied to any application or environment where optimization of database join operations is desirable. The description of the exemplary embodiments which follows is, therefore, for the purpose of illustration and not limitation.

Computer-based Implementation

A. Basic system hardware (e.g., for desktop and server computers)

Figure 1:
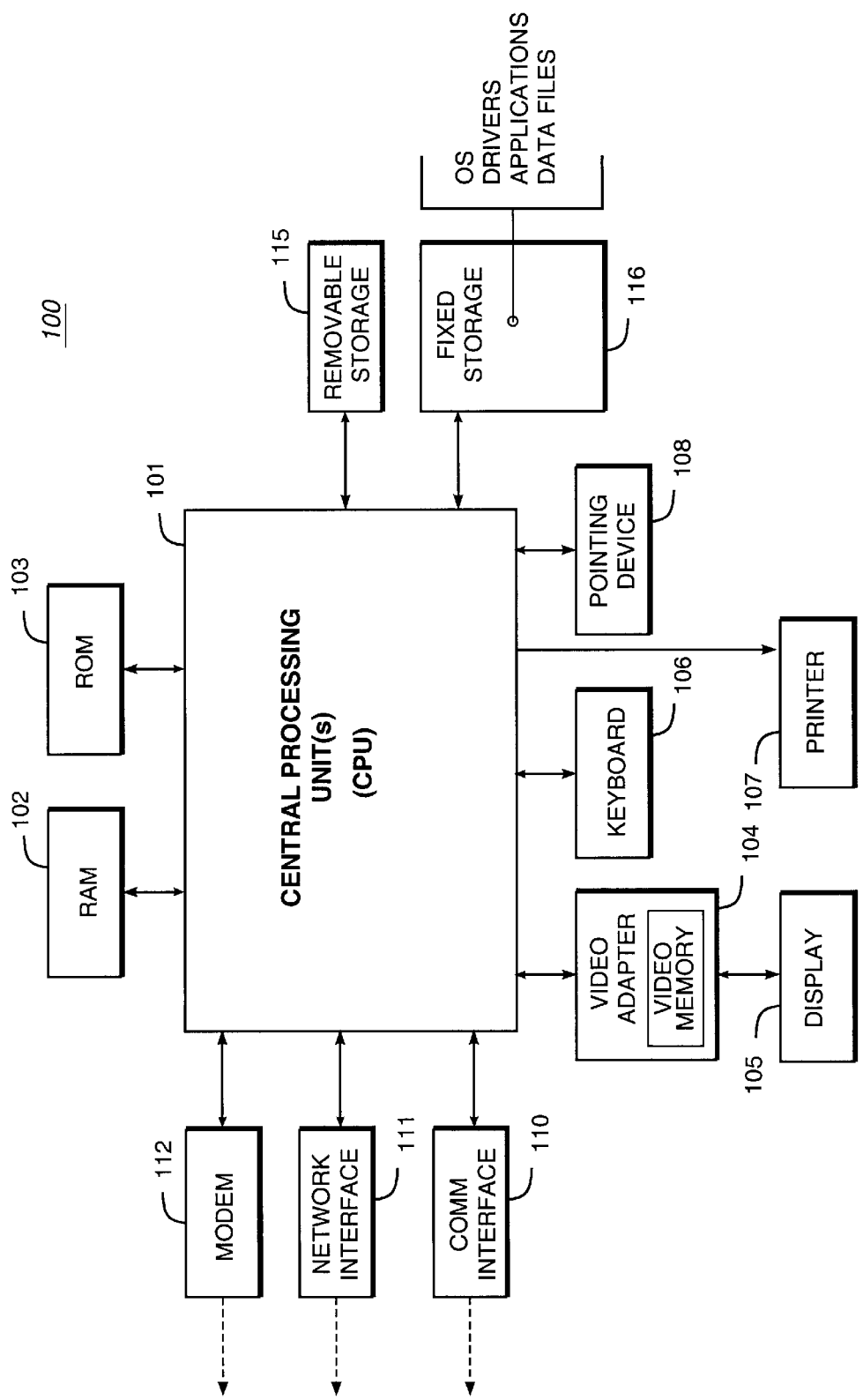
FIG. 1 is a general block diagram illustrating a computer system in which the present invention may be implemented.

The present invention may be implemented on a conventional or generalpurpose computer system, such as an IBM-compatible personal computer (PC) or server computer. FIG. 1 is a very general block diagram of an IBM-compatible system 100. As shown, system 100 comprises a central processing unit(s) (CPU) or processor (s) 101 coupled to a random-access memory (RAM) 102, a read-only memory (ROM) 103, a keyboard 106, a pointing device 108, a display or video adapter 104 connected to a display device 105, a removable (mass) storage device 115 (e.g., floppy disk, CD-ROM, CD-R, CD-RW, or the like), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixteen megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device 105. In this manner, these input devices support manual user input for any process running on the system.

The computer system 100 displays text and/or graphic images and other data on the display device 105. Display device 105 is driven by the video adapter 104, which is interposed between the display device 105 and the system 100. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include an RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic system software

Figure 2:
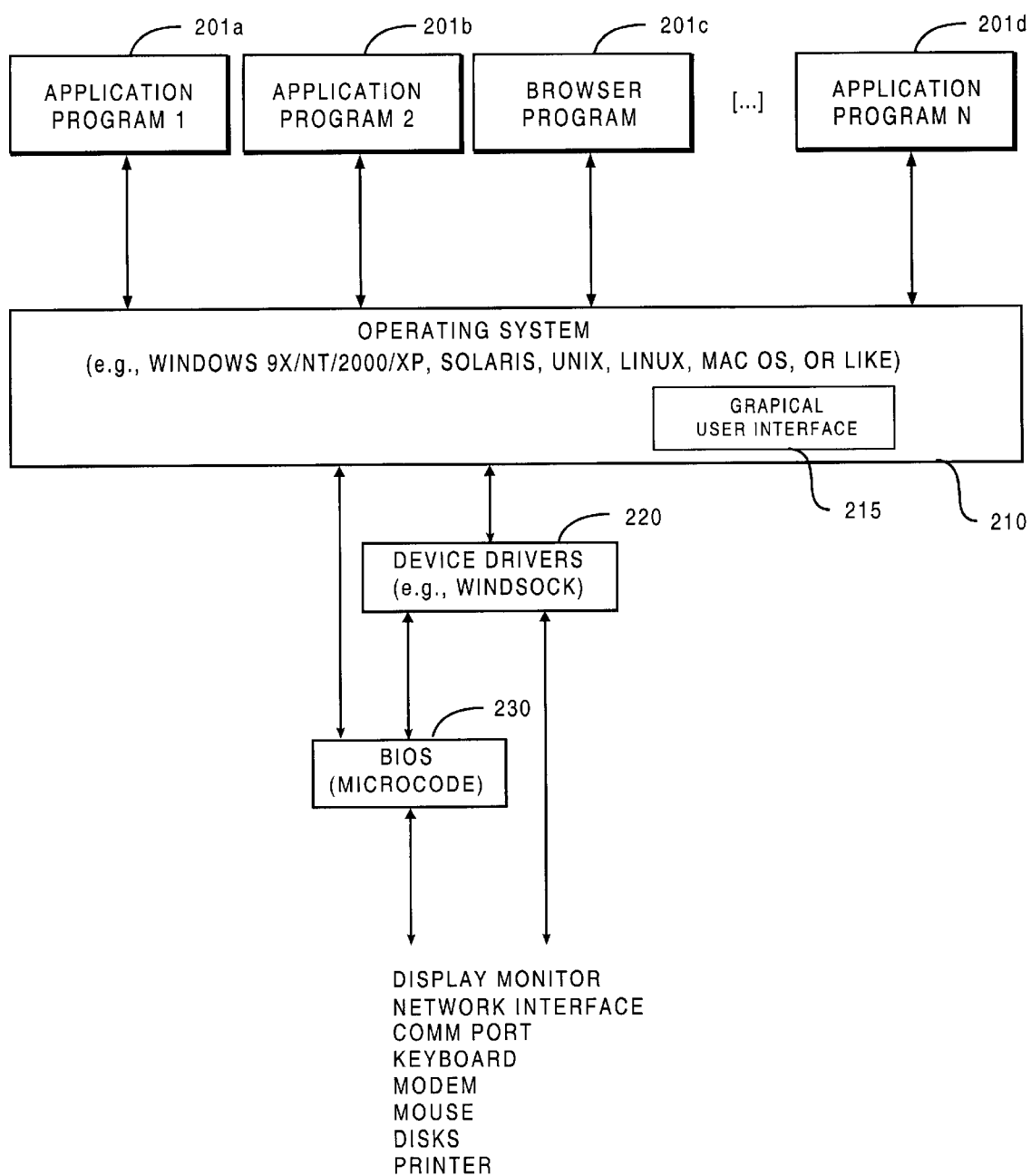
FIG. 2 is a block diagram of a computer software system for directing the operation of the computer system of FIG. 1.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

Software system 200 includes a graphical user interface (GUI) 215, for receiving user commands and data in a graphical (e.g., "point-and-click") fashion. These inputs, in turn, may be acted upon by the system 100 in accordance with instructions from operating system 210 and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver Windows—implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server"(e.g., Web server) which communicates with one or more "clients"(e.g., media capturing devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Client/server database management system

Figure 3:
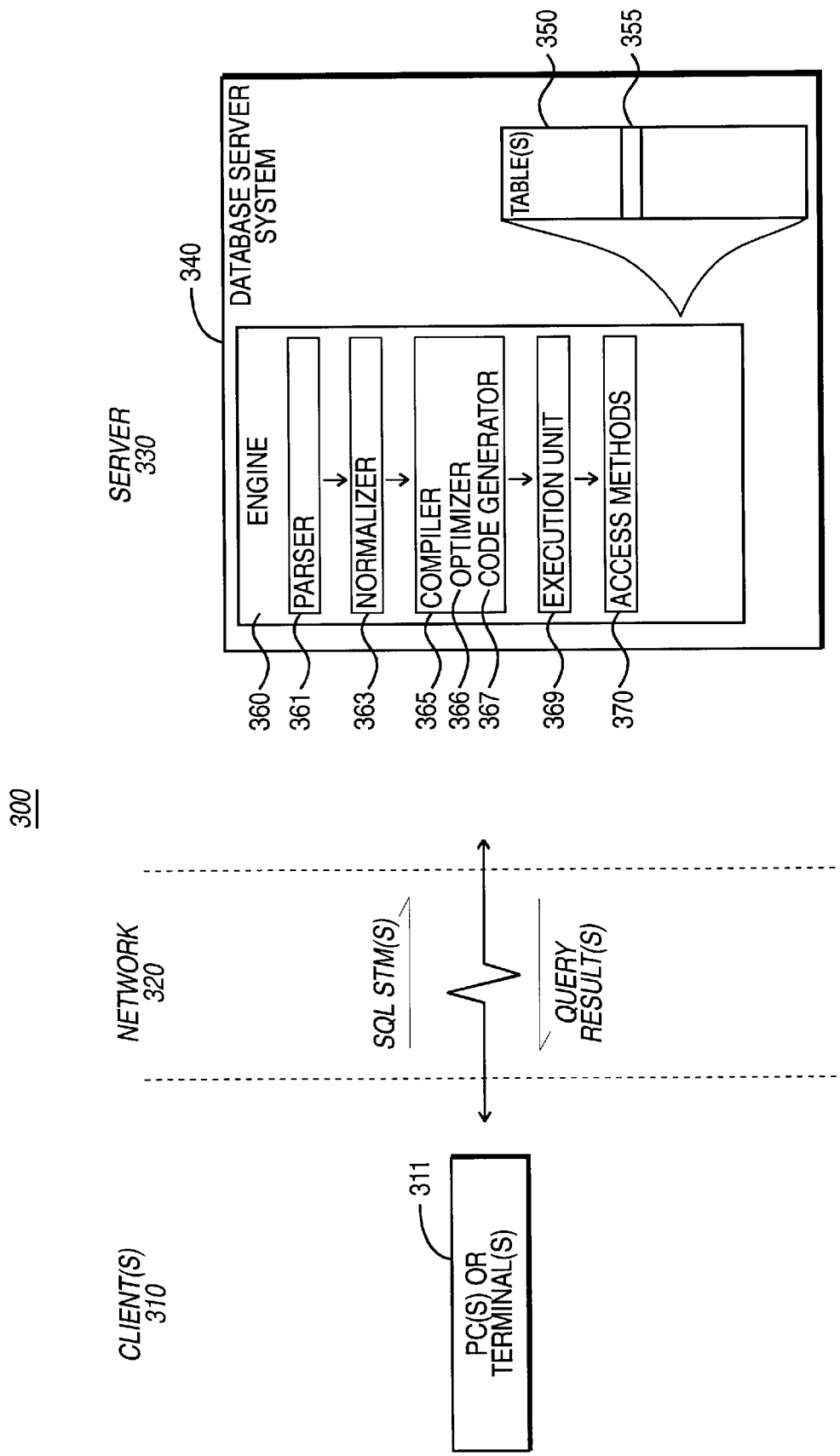
FIG. 3 is a diagram that shows the general structure of a Client/Server Database System suitable for implementing the present invention.

While the present invention may operate within a single (standalone) computer (e.g., system 100), the present invention is preferably embodied in a multi-user computer system, such as a Client/Server system. FIG. 3 illustrates the general structure of a Client/Server Database System 300 suitable for implementing the present invention. As shown, the system 300 comprises one or more Client(s) 310 connected to a Server 330 via a Network 320. Specifically, the Client(s) 310 comprise one or more standalone Terminals 311 connected to a Database Server System 340 using a conventional network. In an exemplary embodiment, the Terminals 311 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 340, which comprises Adaptive Server® Enterprise (available from Sybase, Inc. of Emeryville, Calif.) in an exemplary embodiment, generally operates as an independent process (i.e., independently of the clients), running under a server operating system such as Microsoft Windows NT (Microsoft Corporation of Redmond, Wash.), NetWare (Novell of Provo, Utah), or UNIX (Novell). The Network 320 may be any one of a number of conventional network systems, including a Local Area Network (LAN) or Wide Area Network (WAN), as is known in the art (e.g., using Ethernet, IBM Token Ring, or the like). The Network 320 includes functionality for packaging client calls in the well-known SQL (Structured Query Language) together with any parameter information into a format (of one or more packets) suitable for transmission across a cable or wire, for delivery to the Database Server 340.

In general operation, the Client(s) 310 store data in, or retrieve data from, one or more database tables 350, shown in FIG. 3. Typically resident on the Server 330, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 350. The syntax of SQL (Structured Query Language) is well documented; see, e.g., the abovementioned "An Introduction to Database Systems." In addition to retrieving the data from Database Server tables, the Clients also include the ability to insert new rows of data records into the table; Clients can also modify and/or delete existing records in the table.

The SQL statements received from the one or more Client(s) 310 (via Network 320) are processed by Engine 360 of the Database Server System 340. The Engine 360 itself comprises a Parser 361, Normalizer 363, Compiler 365, Execution Unit 369, and Access Methods 370. Specifically, the SQL statements are passed to the Parser 361 which converts the statements into a query tree—a binary tree data structure which represents the components of the query in a format selected for the convenience of the system. In this regard, the Parser 361 employs conventional parsing methodology (e.g., recursive descent parsing).

The query tree is normalized by the Normalizer 363. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 365, which includes an Optimizer 366 and a Code Generator 367. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 369. Operating under the control of these instructions, the Execution Unit 369 generates calls into lower-level routines, such as the Access Methods 370, for retrieving relevant information (e.g., row 355) from the database table 350. After the plan has been executed by the Execution Unit, the Server returns a query result or answer table back to the Client(s).

For enhancing the speed in which the Database Server stores, retrieves, and presents particular data records, the Server maintains one or more database indexes on the table. A database index, typically maintained as a B-Tree (or B+-Tree) data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

Client/server environments, database servers, and networks are well documented in the technical, trade, and patent literature. For a discussion of database servers and client/server environments generally and Sybase® Adaptive Server® Enterprise particularly, see, e.g., Nath, A., "The Guide to SQL Server," Second Edition, Addison-Wesley Publishing Company, 1995. For documentation of Sybase® Adaptive Server® Enterprise is available from Sybase, Inc. as "Adaptive Server Enterprise 12.0 Product Documentation"(currently available at http.//sybooks.sybase.com/asg1200e.html), the disclosure of which is hereby incorporated by reference.

N-ary nested loop joins

A. N-ary joins introduction

A database query may specify a "join" between two (binary join) or more (n-ary join) tables. Each table itself is composed of rows and columns. For example, as illustrated in FIG. 4, Table T1 includes Columns C1 and C5 (among others), Table T2 includes Column C2, Table T3 includes Columns C3 and C4, and so forth and so on. To specify a join of two tables, for example, the following query statement may be employed:

select [. . . ] from T1, T2
       where T1.C1=T2.C2

In the above example, the SELECT query specifies a join of Tables T1 and T2, using a join condition (WHERE) of T1.C1=T2.C2.

To specify a join of all three tables, the following query statement may be employed:

select [. . . ] from T1, T2, T3
       where T1.C1=T2.C2
       and T2.C2 T3.C3
       and T1.C5=T3.C4

Here, the SELECT SQL statement specifies a join of all three tables, T1, T2, and T3. This n-ary join specifies multiple join conditions: T1.C1=T2.C2, T2.C2=T3.C3, and T1.C5=T3.C4. In effect, the query specifies the following. Fetch a row from Table T1, take the C1 value, and find a matching value from Column C2 of Table T2. Once a matching value is obtained from Column C2, the query attempts to find a matching value from Column C3 of Table T3.

Consider a modification to the foregoing query which adds an additional join condition: T1.C5=T3.C4. Now, to find a qualifying row from Table T3, T3 must match values both from Table T2 and Table T1. This aspect is demonstrated by considering some sample values, which are illustrated in FIG. 4. As shown, the first row of Table T1 stores the value of 1 for Column Cl. The first several rows of Table T2 store the value of 1 for Column C2. (Often, a second table in a join will include a join column storing a number of identical values, for instance when the second table is used to store IDs or department numbers.) In this example, the first row of Table T2 does in fact store a matching value, since both T1.C1 and T2.C2 are equal to 1. The first row of Table T3 also stores a matching value of 1 at Column C3. However, the third join condition fails since the value of T3.C4 is 2 which does not match the value of T1.C5 (which is 3). Accordingly, the first row of T3 does not qualify.

Normally at this point (of encountering a non-qualifying row in Table T3), the query execution would proceed back to the point of last match (i.e., Table T2, for this example)

and then proceed to examine the next row in Table T3 (in an effort to find a match). Here, Table T3 has two conditions: a first condition on Table T2 (which is being matched), and a second condition on Table T1 (which is not being matched). Since the condition on Table T1 is not qualified, until the row on Table T1 is changed, the query execution could examine millions of rows in Table T2 without finding a qualifying match. This condition is a substantial performance hit, which the present invention seeks to eliminate.

In accordance with the present invention, this condition is caught. In the example, when query execution matches on the join condition of T2.C2=T3.C3 but misses on the join condition T1.C5=T3.C4, the approach of the present invention is to return to Table T1 to fetch the next row (instead of continuing to scan Table T2). Here, the approach of the present invention is to not continue looping on an inner table of the join when a join condition of the outer table has not been met. Thus, in this manner, all of the work of scanning the inner table (e.g., Table T2 in this example) is avoided.

In accordance with the present invention, when a join condition is encountered that is not satisfied, query execution proceeds to fetch a next row from the outermost table that has a join condition which is satisfied (instead of simply returning to the previous table in the join order). Although the foregoing example has presented join conditions that use equality (=) operators, those skilled in the art will appreciate that the join condition itself may include any valid SQL operator (e.g., ANSI-92 SQL) for comparing two fields.

B. N-ary join detailed discussion

1. Scan, Table Scan, and Index Scan

Table scan means the scan of a table without using an index. A scan is retrieval of rows from a table using one access path (i.e., a table scan or an index scan). For brevity, retrieving rows from a table using multiple access paths, such as the union or intersection of several index scans, is not considered here. However, the technique described herein can easily be generalized to scans that use multiple access paths. Also, only B+tree indices will be considered here.

2. Sargable and Non-Sargable Predicates

In the currently-preferred embodiment, an access methods (AM) layer provides interface methods to do a table scan or an index scan with an optional conjunct of SARGs (see e.g., the abovementioned "Access Path Selection in a Relational Database Management System") as filtering predicates. A SARG is a predicate that can be expressed in the form of <column identifier><relop><value>, where <relop>is a simple operator like <=, <, >, >=, != or =. Filtering predicates that cannot be expressed as SARGs are called non-sargable predicates and are applied in the query processing (QP) layer. For brevity, the description below is restricted to sargable predicates.

3. Variations of NLJ

Consider an NLJ between two tables, A and B, in that order (i.e., A is the outer table and B is the inner table). The selection predicates, if any, on A (B) are applied during the scan of A (B). A tuple-level NUL performs a scan of B for each row returned by the scan of A. Block-level NLJ groups the rows returned by the scan of A into blocks that can fit in memory and performs a scan of B once for each block. For simplicity, this description is restricted to tuple NLJ, but this technique can also be applied to block-level NLJ.

4. Push Down of Join Predicates

Consider an NLJ between two tables, A and B, in that order. The join predicates between A and B, if any, are used as filtering predicates during the scans of B. So, a scan of B returns only the rows that satisfy the selection predicates on B and also joins with the current row of A. A Cartesian product is processed as an NLJ without a join predicate in the currently-preferred embodiment. In general, for an n-ary NLJ involving n tables A1, A2, ... and An, in that order, the filtering predicates for the scan(s) of Ai, where $1 < i <= n$ include the selection predicates on Ai and the join predicates between Ai and the tables that precede it.

5. Costing n-ary NLjs

Costing n-ary NLJs in the optimizer is not complete. Currently, the optimizer generates plans with only binary join operators. Subsequently, the code generator coalesces some binary NLJ operations into n-ary NLJ operations. Specifically, if the result of a binary NLJ operator, say N1, forms the input of another NLJ operator, say N2, and the result of N1 is not being materialized, then N1 is removed and its operands are made the operands of N2. This technique is used at execution time to process the n-ary NLJs more efficiently.

C. N-ary NLjs

Figure 5:
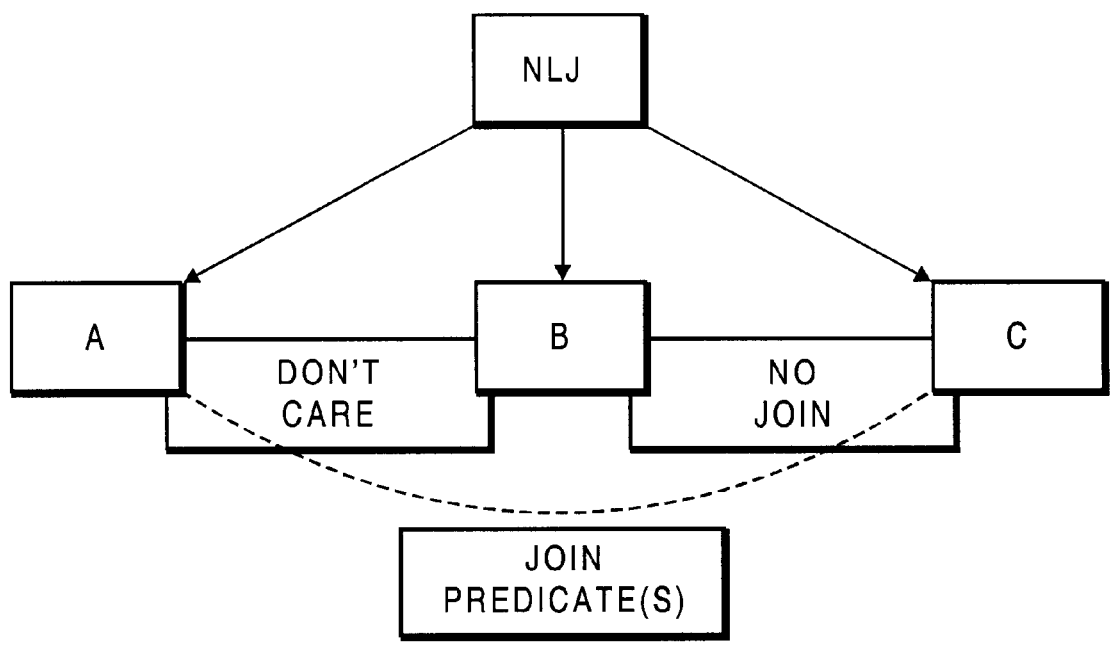
FIG. 5 is a diagram of a 3-way NLJ among tables A, B, and, C, with a join predicate between A and C, but no join predicate between B and C.

1. 3-way NLJ among Tables A, B, and C, in that order, with a join predicate between A and C, but no join predicate between B and C Consider the 3-way NLJ, such as illustrated in FIG. 5. There is no join predicate between B and C, but there is a join predicate between A and C. A join predicate(s) between A and B, if any, is irrelevant. Suppose that a row in A, say a1, joins with multiple rows in B, say b1, b2, and b3. If the NLJ finds that (a1, b1) does not have a match in C, it closes the scan on B and moves to the next row in A. So the combinations (a1, b2) and (a1, b3) are not generated.

Doing this optimization with hash or merge join methods requires performing a semi-join (or some variation of it, such as a bit vector filter), if the joins involved need different sorting/hashing criterion (e.g., if the join predicates were A.x=B.x and A.y=C.y, where x and y are distinct columns). If the join predicates were A.x=B.x and A.x=C.x, a 3-way merge join would be easy to do as all three tables can be sorted on column x and a 3-way merge algorithm known in database literature can be applied. However, if the join predicates are A.x=B.x and A.y=C.y, such a 3-way merge algorithm would not be applicable as the rows in A would have to be sorted on x for the first join and they need to be sorted only for the second join. Thus a 3-way NLJ algorithm may become more valuable in such cases.

Figure 6:
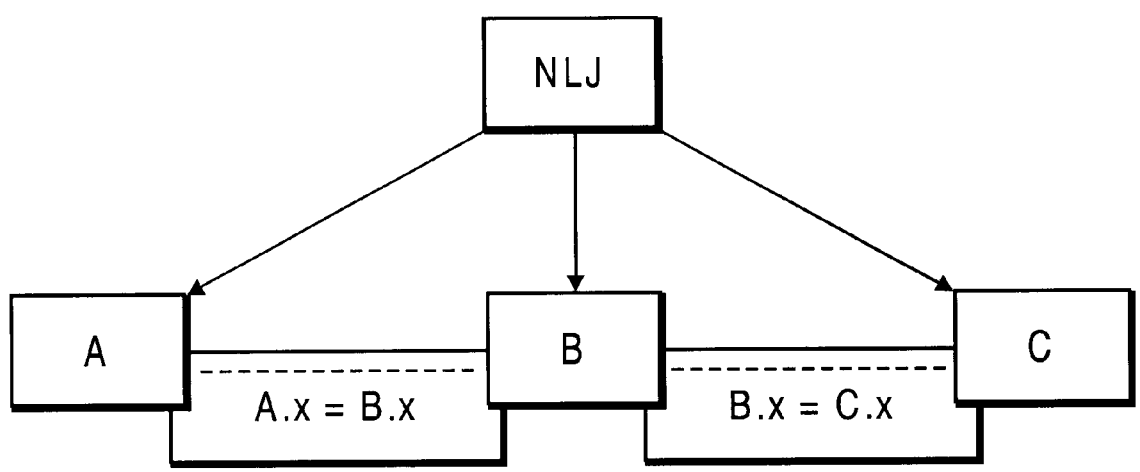
FIG. 6 is a diagram of a 3-way NLJ between tables A, B, and C, with a replaceable predicate between B and C.

2. 3-way NLJ between Tables A, B, and C (in that order) with a Replaceable Predicate between B and C Even if there is a join predicate between B and C, and if it can be replaced with a predicate between A and C, this optimization is applicable. As as example, consider the following 3-way NLJ among tables A, B, and C, in that order, with "A.x=B.x" and "B.x=C.x" as the join predicates, as illustrated in FIG. 6. Although there is a join predicate between B and C, it could be replaced with the predicate "A.x=C.x"and use the same optimization as before.

Figure 7:
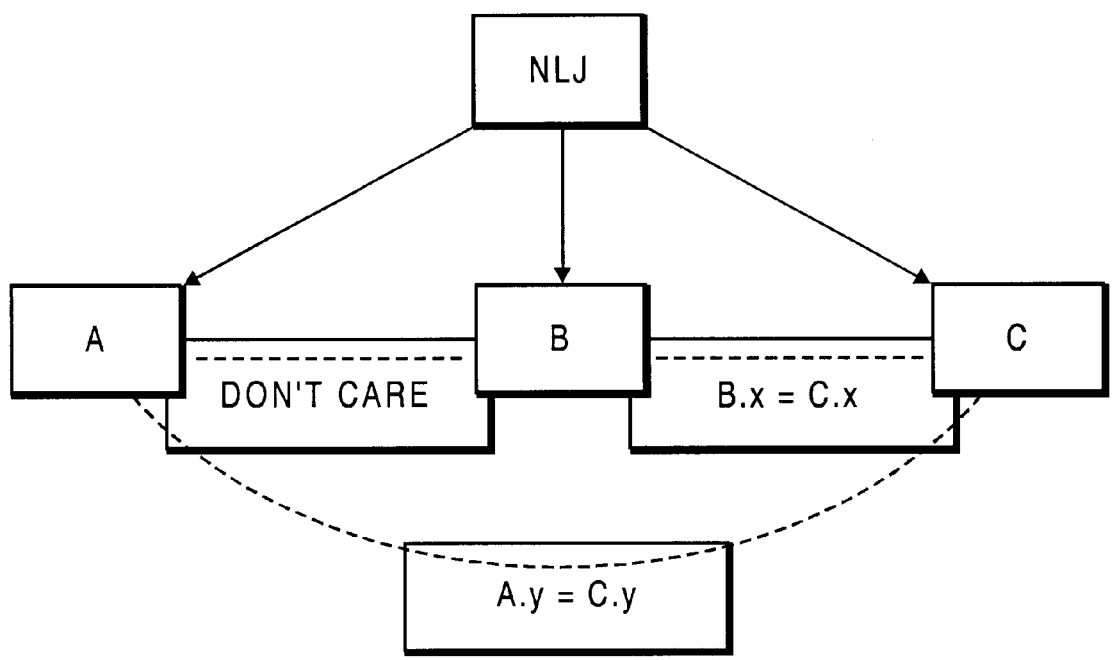
FIG. 7 is a diagram of a 3-way NLJ among tables A, B, and C, with multiple predicates involving C.

3. 3-way NLJ among Tables A, B, and C (in that order) with Multiple Predicates involving C Consider the following 3-way NLJ among tables A, B, and C, in that order, with a conjunction of two join predicates "A.y=C.y" and "B.x=C.x" involving table C. This type of join is illustrated in FIG. 7. The join predicate between A and B, if any, is irrelevant. Suppose that a row in A, say a1, matches multiple rows in B, say b1, b2, and b3. For the combination (a1, b1), the NLJ needs to retrieve the matching rows in C, if any. There are two cases depending upon which conjunct is processed first.

(a) Conjunct "C.y=a1.y" is evaluated before "C.x=b1.x"

In this case, if no row in C matches the first conjunct, the NLJ closes the scan of B and moves to next row in A (i.e., the combinations (a1, b2) and (a1, b3) are not generated).

(b) Conjunct "C.x=b1.x" is evaluated before "C.y=a1.y"

In this implementation, the second conjunct is not applied when a row fails the first conjunct. The rows that did not satisfy the first conjunct could possibly satisfy C.y=a1.y. Hence NLJ cannot avoid generating the combinations (a1, b2) and (a1, b3). In (a) above, the ordering of conjuncts matches the join order, and such an ordering works better for NLJ. However, effective use of an index requires that the conjuncts involving index columns be evaluated in the same order as the columns appear in the schema of the index. For example, if the scan of C is using an index that has C.x as the first index column, it evaluates the conjunct involving C.x first. In this implementation, while ordering the conjuncts, the index schema definition is given higher priority than the join order.

4T. Generalization to an n-ary NLJ

The following briefly describes how the ideas mentioned before have been generalized to an n-ary NLJ in this prototype. Consider an n-ary NLJ among n tables A1, A2, . . . and An, in that order. It is assumed that the predicate replacement mentioned earlier has already been performed. Consider the scan on Am, where $1<=m<=n$. Let the filtering predicates for the scan of Am be a conjunction of k predicates P1, P2, . . . and Pk, where $k>=0$. It is assumed that the conjuncts have already been ordered according to the criterion briefly mentioned earlier. The predicate dependency of a selection predicate on Am is defined as 0. The predicate dependency of a join predicate involving Am is defined as {d |P involves Ad but no table preceding Ad}. Let Di be the predicate dependency of Pi, where $1<=i<=k$. If the scan of Am does not return any rows, and if the scan only used p conjuncts, where $1<=p<=k$, NLJ moves to the next row in Aj, where j=MAX {Di|$1<=i<=p$}. The scan on Am and the scans on the tables between Aj and Am, if any, are closed.

D. Methodology

1. High-level Description

Figure 8:
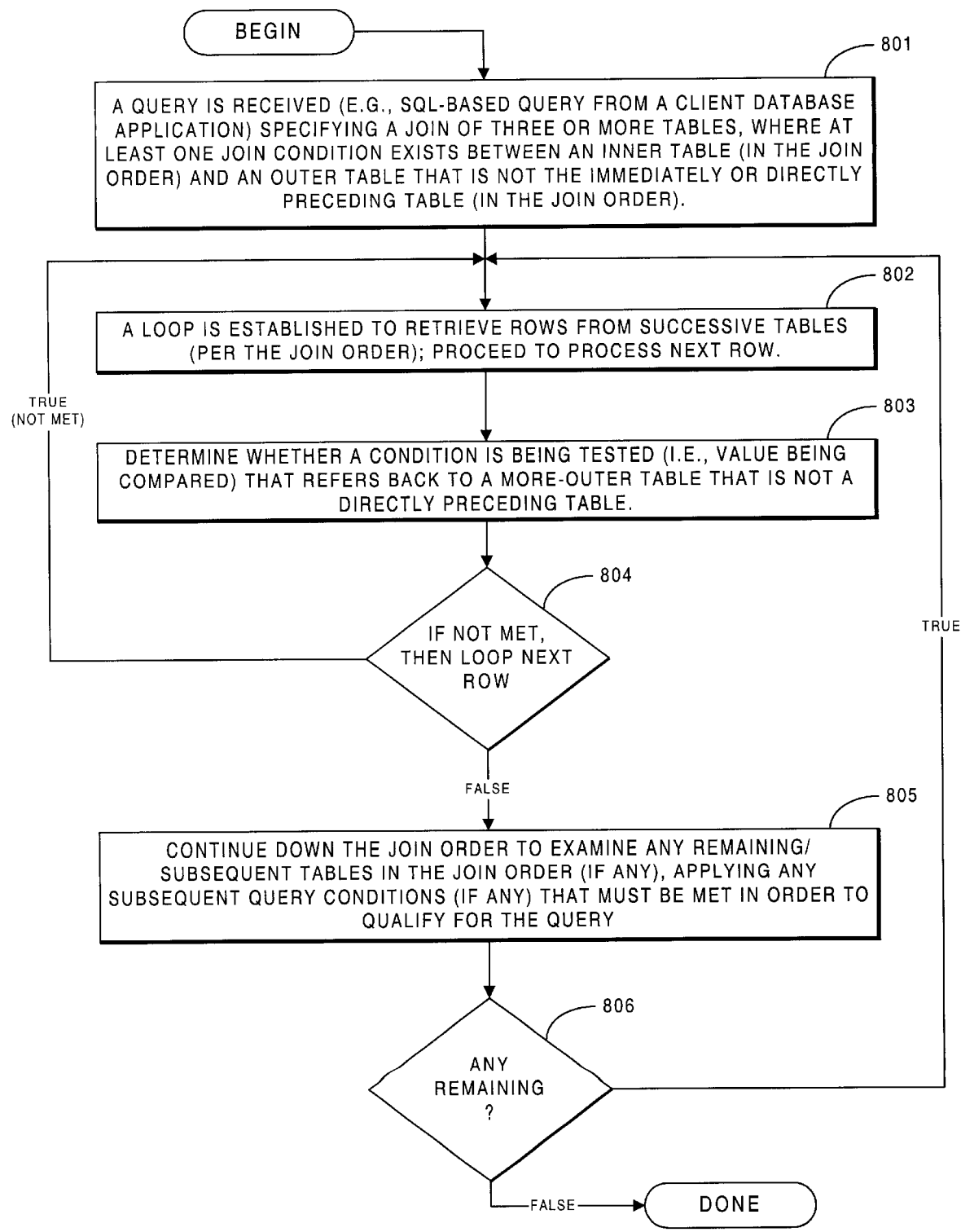
FIG. 8 is a high-level flowchart illustrating the methodology of the present invention for performing joins of 3 or more tables.

FIG. 8 illustrates a high-level methodology of the present invention for performing joins of three or more tables. At step 801, a query is received (e.g., SQL-based query from a client database application) specifying a join of three or more tables, where at least one join condition exists between an inner table (in the join order) and an outer table that is not the immediately or directly preceding table (in the join order). The join order itself specifies the particular sequence or order that tables (or an index(s)) are accessed for retrieving rows (for examination) during query execution.

Query execution proceeds as follows. At step 802, a loop is established to retrieve rows from successive tables (per the join order). At step 803, the method determines whether a condition is being tested (i.e., value being compared) that refers back to a more-outer table that is not a directly preceding table. For instance, in the example of FIG. 4, the join condition of T1.C5=T3.C4 requires a current row under examination from the third table in the join order (i.e., Table T3) to match the join condition (equality, in that example) specified for the first table (i.e., Table T1, which is not an immediately preceding table). If that condition is not met, then query execution (method) proceeds to fetch the next row (if any) from that outer table (whose just-tested condition failed), as indicated by step 804.

Otherwise (i.e., the just-tested condition succeeds), the method continues down the join order to examine any remaining/subsequent tables in the join order (if any), applying any subsequent query conditions (if any) that must be met in order to qualify for the query, as indicated that step 805. In the instance that a set of rows under examination meets the query condition(s), those rows are qualified (as having met the query). If any further rows/tables remain to be examined, the method loops back to examine those rows/tables, as indicated by step 806.

2. Internal Operation

Internally the database system must keep track of which particular join failed. More particularly, the internal access methods of the database system must keep track of which which row disqualifies and why. In the currently-preferred embodiment, query execution is tracked through use of an array of descriptors. The internal database engine works off of a query plan, which itself is built-up of operators. Of particular interest is an n-ary nested-loop join operator, which has access to an array of pointers or references (per the join order) to all of the join operations that occur (i.e., all of the scan operations that are occurring in the joins). The join operators, which themselves are implemented as C++classes, represent the scans of the tables (or indexes). During query execution, once a query plan has been formulated, the array of references is populated with valid references to the various join scans. These references correspond to child operators (join operators), which are arranged in order according to the selected join order.

Operation occurs as follows during query execution. The n-ary nested-loop join operator invokes a "next" method on the first join operator/scan (and thereupon obtains a reference value from a first table or index) and invokes a "next" method on the second join operator/scan (and thereupon obtains a reference value from a second table or index), thereby providing a join of two tables. If that succeeds (i.e., upon application of the then-relevant join condition to the reference values), the n-ary nested-loop join operator proceeds to invoke the "next" method on the subsequent join operator, and so forth and so on (i.e., invoking subsequent "next" methods and applying join conditions), so long as the application of subsequent join conditions continues to hold true. Upon encountering a failure condition (i.e., a given join condition does not hold true) from a join operator (scan child), context information (about the failure) is returned to the n-ary nested-loop join operator, for indicating exactly which condition (i.e., join condition) failed. This information is tracked in a scan descriptor, which includes a "fail sarg" data field indicating exactly which particular search argument ("sarg") failed. Based on this information, the n-ary nested-loop join operator knows exactly which scan child to return back to (i.e., how far back to go to fetch the next row).

E. Benefits

1. Selectivities of Binary Joins Versus N-ary Joins

Sometimes, n-ary joins may have high selectivity although the individual binary joins have low selectivity. A simple, but extreme, example is given below. Consider a 3-way join among three tables A, B, and C, with A.x=B.x and B.x=C.x as the join predicates. Let the table A have many rows, but only two values for A.x, 0 and 1. Let the table B also have many rows, but only two values for B.x, 1 and 2. Let the table C also have many rows, but only two values for C.x, 0 and 2. The result of a join between any two tables is large, but the result of the 3-way join is small. In such cases, this technique can significantly reduce the cost of performing the joins.

2. Star Joins

Figure 9:
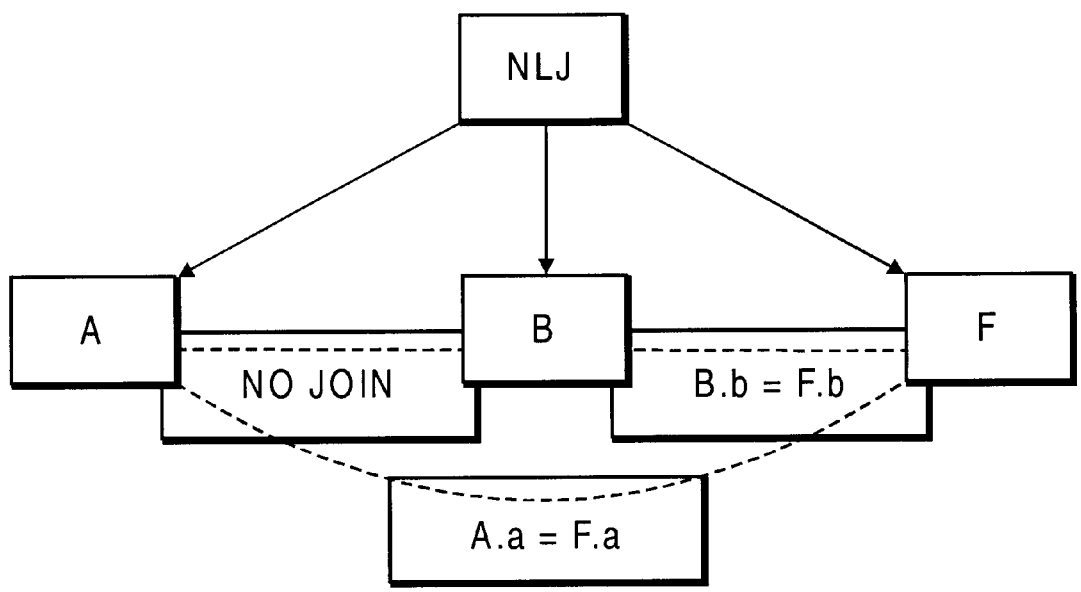
FIG. 9 is a diagram of a star join.

Consider a 3-way NLJ involving two dimension tables, A and B, and a fact table F, in that order. Let the join predicates be A.a=F.a and B.b=F.b. This is a star join, and is illustrated in FIG. 9.

Consider a scan of F. Suppose the conjunct A.a=F.a is evaluated before the other conjunct. If no row in F matches the first conjunct, the NLJ prematurely terminates the scan of B, and it moves to the next row in A. Thus, this technique avoids the generation of unnecessary combinations in the Cartesian product.

3. Bad Join Orders

Sometimes the join order generated by the optimizer may be bad, because of inaccurate statistics or assumptions that do not hold for the case at hand. Note that the final result set is of the same size regardless of what join order is chosen. However, a bad join order may generate larger intermediate results than a good join order, and many of the rows in the intermediate results may get discarded by later joins. This technique attempts to prevent generation of intermediate rows that would get discarded later anyway.

F. Conclusion

A technique has been presented that can significantly improve the performance of some n-ary NLJs. The simplicity of the technique, and the benefits offered by it, make it attractive for implementation in commercial database systems.

G. Source code appendix

Appended herewith as Appendix A are source code listings (in the C++ programming language) providing further description of the present invention. An appropriate C++ development environment (including compiler and linker) for compiling the source code listings is available from a variety of vendors, including Microsoft Visual C++ available from Microsoft Corporation of Redmond, Wash.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

APPENDIX A

SOURCE CODE LISTINGS

| | |
|---|---|
| cgnarynlj.hpp | class definition of the CgScanNaryNLJ class, which sets up the 'jump' information for the n-ary nested loop join operator (LeNaryNLJOp). This information lets the LeNaryNLJOp determine which child-operator (i.e., table scan) to go back to whenever a given join clause is not satisfied. |
| cgnarynlj.cpp | source code for the CgScanNaryNLJ class methods. |
| le_narynljop.hpp | class definition of the LeNaryNLJOp. |
| le_narynljop.cpp | source code for the LeNaryNLJOp class methods. |

```
/** @pkg CodeGen.CgScanNaryNLJ */
# ifndef __CGNARYNLJ_HPP
/**@#-*/
# define __CGNARYNLJ_HPP
/**@#+*/
// Do not change the values for the following symbols
# define CG_NO_DEPENDENCY        -1
# define CG_DEPENDENCY_NOTFOUND (CGMAXARITY + 1)
/* forward declaration */
struct LeNaryNLJInfo;
/**
 *    CgScanNaryNLJ
 *        Class to manage predicate dependencies of a scan operator
 *        that is a child of n-ary NLJ operator. We track the dependencies
 *        of the scan predicates on the preceding siblings of the n-ary
 *        NLJ operator.
 *    MORE DOCUMENTATION: See le_narynljop.hpp for some high level
 *        description of the code changes that implement n-ary NLJ operator
 *        and to get an idea of how this class fits into it.
 */
class CgScanNaryNLJ
{
public:
        /**
         *    Initializes a new CgScanNaryNLJ object.
         *
         *    @param int        Arity of NLJ
```

APPENDIX A-continued

SOURCE CODE LISTINGS

```
 *
 * @param int       Number of elements in the array (3rd param)
 *
 * @param ScScalarList** Array of substitution lists of the operators
 *                  that are the preceding children of parent
 *                  NLJ operator.
 */
CgScanNaryNLJ(int, int, ScScalarList **);
/**
 *   Sets the #sargable predicates in CgScanNaryNLJ class object
 *
 * @param int        # Sargs
 *
 * @param pPhdr         Proc header to allocate array for holding
 *                  sarg dependency info
 */
void CsnSetNumSargs(int, PROC_HDR *);
/**
 *   Adds a predicate dependency.
 * @param TREE *    The tree node that supplies the value in
 *                  predicate
 *
 * @param int        Sarg position if we are adding dependency for
 *                  a sargable predicate. -1 if we are adding the
 *                  dependency for a non-sargable predicate.
 */
void CsnAddDependency(TREE *, int);
/**
 *   Computes the skip branch numbers (i.e branch numbers to
 *   skip to) for the sargs and evals. THIS SHOULD ONLY BE CALLED
 *   AFTER ALL PREDICATE DEPENDENCIES HAVE BEEN ADDED BY CALLING
 *   CsnAddDependency().
 *   This method allocates a new array to store the skip
 *   branch numbers using the proc_hdr passed in and returns
 *   the array.
 *
 * @param PROC_HDR *  Proc header to allocate an array to hold
 *                  skip branch numbers.
 *
 * @returns Array holding skip branch numbers.
 */
LeNaryNLJInfo *pCsnComputeSkipBranchNums(PROC_HDR *);
/**
 * Returns an array of sarg dependencies.
 */
SYB_INLINE int *
pCsnGetSargDependency();
private:
        /**
         *   Gives the child number for the scan operator whose predicate
         *   dependencies are being tracked.
         */
        SYB_INLINE int
        _CsnGetThisBranchNum();
        /**
         *   Gets the adjusted dependency.
         *
         *   If the dependency is CG_DEPENDENCY_NOTFOUND, then we
         *   conservatively use 1 less than this child number.
         *
         * @param int — the dependency to adjust
         *
         * @returns — The adjusted dependency
         */
        SYB_INLINE int
        _CsnGetAdjustedDependency(int);
        ScScalarList    **_ppCsnSubstLists;
        int             _CsnNumSubstLists;
        int             _CsnEvalDependency;
        int             _CsnNumSargs;
        int             *_pCsnSargDependency;
        int             _CsnArityOfNLJ;
};
#ifdef USE_INLINE
#include <cgnarynlj.icpp>
#endif
# endif
```

APPENDIX A-continued

SOURCE CODE LISTINGS

```
# include          <cgincludefiles.hpp>
extern "C"
{
# include          <le_operator.h>
# include          <seq_dcl.h>
}
# include <cgnarynlj.hpp>
# include <le_scanop.hpp>
#ifndef USE_INLINE
#include <cgnarynlj.icpp>
#endif
//
//      CgScanNaryNLJ::CgScanNaryNLJ
//
//      Constructor for the CgScanNaryNLJ class. This class tracks the
//      predicate dependency info for a scan operator that is a child of
//      an n-ary NLJ operator.
//
//      Parameters
//          ArityOfNLJ       — Arity of the n-ary NLJ
//          NumSubstLists    — # substitution lists in the array (3rd
//                             param)
//          ppSubstLists     — Array of substitution lists of the operators
//                             that are the preceding children of parent
//                             NLJ operator.
//
//
CgScanNaryNLJ::CgScanNaryNLJ(int ArityOfNLJ, int NumSubstLists,
                    ScScalarList **ppSubstLists)
{
        _CsnArityOfNLJ = ArityOfNLJ;
        _CsnNumSubstLists = NumSubstLists;
        _ppCsnSubstLists = ppSubstLists;
        _CsnEvalDependency = CG_NO_DEPENDENCY;
        _pCsnSargDependency = NULL;
        _CsnNumSargs = -1;
}
//
//      CgScanNaryNLJ::CgSetNumSargs
//
//      Sets the #sargable predicates in CgScanNaryNLJ class object.
//
//
//      Parameters
//          NumSargs    — # sargsable predicates
//          pPhdr               — Proc header to allocate array for holding
//                                sarg dependency info
//
//      Side-effects
//          Allocates an array for holding sarg dependency info
//
//
void
CgScanNaryNLJ::CsnSetNumSargs(int NumSargs, PROC_HDR *pPhdr)
{
        _CsnNumSargs = NumSargs;
        if (NumSargs > 0)
        {
            _pCsnSargDependency = new (pPhdr) int[NumSargs];
            // Initialize the dependency info.
            for (int i = 0; i < NumSargs; i++)
            {
                _pCsnSargDependency[i] = CG_NO_DEPENDENCY;
            }
        }
}
//
//      CgScanNaryNLJ::CsnAddDependency
//
//      Adds a predicate dependency.
//
//      Parameters
//          pTree           — Pointer to a treenode holding a CONSTANT
//                            that is referenced in the predicate
//          SargPos         — Position of the sarg if we are adding
//                            a predicate dependency for a sargable
//                            predicate. -1 if we are adding the
```

APPENDIX A-continued

SOURCE CODE LISTINGS

```
//                      predicate dependency for a non-sargable
//                      predicate.
//
//      Side-effects
//          The predicate dependencies tracked in _CsnEvalDependency
//          or _pCsnSargDependency could get modified.
//
//
void
CgScanNaryNLJ::CsnAddDependency(TREE *pTree, int SargPos)
{
        int             FoundIndex = CG_DEPENDENCY_NOTFOUND;
        CONSTANT  *pConst;
        int             i;
        SYB_ASSERT(TOK_CHECKCLASS(pTree—>sym.node.type, SYB_CONST));
        pConst = (CONSTANT *)pTree—>left;
        SYB_ASSERT(pConst);
        // LAVA_RESOLVE : Revisit this.
        if ((pConst—>constat2 & (CONST2_VALUE_KNOWN|CONST2_MISSING_PARM)) ||
           (pConst—>constat & (CONST_PARAM|CONST_SPEC_VALUE_KNOWN|
                    CONST_VARIABLE)))
        {
            // No dependency in this case.
            FoundIndex = CG_NO_DEPENDENCY;
            goto skip_search;
        }
        SYB_ASSERT((pConst—>constat & CONST_EXPR) ||
                (pConst—>constat & CONST_COLUMN));
        // Locate the constant in the pTree in the Substitution lists.
        for (i = _CsnNumSubstLists - 1; i >= 0; i--)
        {
            ScScalarList      *pSubstList;
            ScScalarIter      ii;
            ScScalarType      *pSubst;
            pSubstList = _ppCsnSubstLists[i];
            // Walk the Substitution list searching for pTree.
            for (ii = pSubstList—>begin(); ii != pSubstList—>end(); ++ii)
            {
                pSubst = *ii;
                SYB_ASSERT(pSubst—>left);
                SYB_ASSERT(TOK_CHECKCLASS(pSubst—>sym.node.type,
                            SYB_CONST));
                if ((pSubst == pTree) || (pSubst—>left == pTree—>left))
                {
                    // It seems like either both should match or
                    // neither.
                    SYB_ASSERT((pSubst == pTree) &&
                            (pSubst—>left == pTree—>left));
                    FoundIndex = i;
                    break;
                }
            }
        }
        if (FoundIndex == CG_DEPENDENCY_NOTFOUND)
        {
            // We did not find the CONSTANT in any Substitution list. This
            // case most probably indicates a bug. Hence this assertion.
            // However, when we compute skip branch numbers from the
            // dependencies, we use a conservative value and so the
            // optimized server should give correct results. See
            // the method _CsnGetAdjustedDependency() and the use of it
            // for more info.
            SYB_ASSERT(0);
        }
skip_search :
        if (TRACE(DECISION, 43))
        {
            TRACEPRINT("(Branch = %d, sargpos = %d, dependency = %d)\n",
                    _CsnGetThisBranchNum(), SargPos, FoundIndex);
        }
        if (SargPos < 0)
        {
            // We are dealing with Evals here.
            if (FoundIndex > _CsnEvalDependency)
            {
                // Found a stronger dependency.
                _CsnEvalDependency = FoundIndex;
```

APPENDIX A-continued

SOURCE CODE LISTINGS

```
            }
            return;
        }
        // We are dealing with sargs.
        if (FoundIndex > _pCsnSargDependency[SargPos])
        {
            // Found a stronger dependency.
            _pCsnSargDependency[SargPos] = FoundIndex;
        }
}
//
//      CgScanNaryNLJ::pCsnComputeSkipBranchNums
//
//      Computes the skip branch numbers for the sargable and non-sargable
//      predicates. This method should be called only after all the
//      predicate dependencies for this scan operator have been added by
//      calling CsnAddDependency() method.
//
//      Parameters
//          pPhdr               — Proc header to allocate an array to hold
//                                skip branch numbers
//
//      Side-effects
//          The skip branch numbers are computed and stored.
//
//
LeNaryNLJInfo *
CgScanNaryNLJ::pCsnComputeSkipBranchNums(PROC_HDR *pPhdr)
{
        LeNaryNLJInfo   *pNaryNLJInfo;
        int         *pSkipTo;
        int         SkipBranch;
        // create an nary NLJ object.
        pNaryNLJInfo = new (pPhdr) LeNaryNLJInfo;
        // Nothing to calculate for eval dependencies.
        SkipBranch = _CsnGetAdjustedDependency(_CsnEvalDependency);
        pNaryNLJInfo—>LnEvalDepend = _CsnEvalDependency;
        pNaryNLJInfo—>LnEvalSkipBranch = SkipBranch;
        // If no sargs return here.
        if (_CsnNumSargs == 0)
        {
            pNaryNLJInfo—>pLnSargSkipBranch = NULL;
            pNaryNLJInfo—>pLnSargDepend = NULL;
            return pNaryNLJInfo;
        }
        // Allocate array for skip branch numbers. LAVA_RESOLVE we could
        // use the same array as sarg dependencies.
        pNaryNLJInfo—>pLnSargSkipBranch = new (pPhdr) int[_CsnNumSargs];
        pNaryNLJInfo—>pLnSargDepend = _pCsnSargDependency;
        // Just save a little dereferncing.
        pSkipTo = pNaryNLJInfo—>pLnSargSkipBranch;
        // Do the computation for sargs. What is happening below is
        // best explained through an example.
        // Example: Suppose that the current scan is branch b of the nary
        // NLJ. Also, suppose that there are 3 sargs s1. s2 and s3. Also,
        // suppose that
        // — s1 is dependent on branch b1 of the nary NLJ.
        // — s2 is dependent on branch b2
        // — s3 is dependent on branch b3
        // Normally, if there is no match from this scan, NLJ fetches
        // next row from branch b - 1.
        // If s1 is the only sarg that was used, s2 and s3 can be
        // assumed to be non-existent. So if no row passed s1, NLJ
        // can fetch next row from b1 (instead of b - 1).
        //
        // If s1 and s2 were the only sargs used, then NLJ can fetch next
        // row from MAX (b1, b2). As long as the NLJ is positioned on same
        // row in b1 and same row in b2, there will not be any match from
        // this scan because no row passes both s1 and s2.
        SkipBranch = _CsnGetAdjustedDependency (_pCsnSargDependency[0]);
        pSkipTo[0] = SkipBranch;
        for (int i = 1; i < _CsnNumSargs; i++)
        {
            SkipBranch = _CsnGetAdjustedDependency(
                                _pCsnSargDependency[i]);
            pSkipTo[i] = MAX (pSkipTo[i-1], SkipBranch);
        }
```

APPENDIX A-continued

SOURCE CODE LISTINGS

```
            // Update the skip branch dependency.
            SkipBranch = pNaryNLJInfo—>LnEvalSkipBranch;
            pNaryNLJInfo—>LnEvalSkipBranch = MAX (pSkipTo[_CsnNumSargs - 1],
                                    SkipBranch);
            return pNaryNLJInfo;
}
SYB_INLINE int
CgScanNaryNLJ::_CsnGetThisBranchNum()
{
            return _CsnNumSubstLists;
}
SYB_INLINE int*
CgScanNaryNLJ::pCsnGetSargDependency()
{
            return _pCsnSargDependency;
}
SYB_INLINE int
CgScanNaryNLJ::_CsnGetAdjustedDependency(int Dependency)
{
            int   SkipBranch;
            SkipBranch = Dependency;
            if (SkipBranch == CG_DEPENDENCY_NOTFOUND)
            {
                // Conservatively, set the dependency as
                // the immediately preceding branch.
                SkipBranch = _CsnGetThisBranchNum() - 1;
            }
            return SkipBranch;
}
/**
 * Base class for all nary operators. The data and code that is
 * common for all nary operators should be moved to this class.
 */
class LeNaryOp : public LeParentOp
{
public:
            SYB_INLINE
            LeNaryOp(
                LeVirtAddr          VA,
                LeOperator          **pChilrenOps,
                int                 MaxChildNo,
                PROC_HDR            *pPhdr
                );
            /** Make the destructor virtual */
            virtual ~LeNaryOp() { };
            SYB_INLINE virtual int LePoGetArity() const;
            SYB_INLINE virtual LeOperator *LePoGetNthChild(int) const;
            SYB_INLINE virtual void LePoSetNthChild(int, LeOperator *);
            SYB_INLINE int LePoGetChildOpNo();
protected:
            LeOperator              **_pLeNoChildren;
            int                     _MaxChildNo;
};
/**
 *
 * Code changes for n-ary nested loop joins implementation
 * ------------------------------------------------------------------
 *
 * The changes to implement n-ary NLJ can be divided into the following
 * categories:
 *
 * 1.   Support from the optimizer:
 *
 * The optimizer does not cost the n-ary NLJ optimizations being done
 * during execution. However, it does the following to increase the
 * benefit offered by n-ary NLJs.
 *
 * —   Transitive closures are performed for join predicates (conceptually).
 *     So, if there are join predicates of the form A.x = B.x and B.x = C.x,
 *     then a predicate A.x = C.x is added. This allows more join orders to
be
 *     considered. After the join order has been chosen, if the join order
 *     is {A, B, C}, then the predicate B.x = C.x is dropped.
 *
 *     This increases the number of cases where a query can benefit from
 *     the n-ary NLJ optimizations.
 *
```

APPENDIX A-continued

SOURCE CODE LISTINGS

```
* —    Star joins: Consider a star join between dimension tables A and B
*      and a fact table F. Let the join predicates be F.a = A.a and
*      F.b = B.b. When the optimizer is considering the use of an index
*      on (F.a, F.b) or just F.a, it prefers the join order A, B, F to
*      join order B, A, F if the costs for both these join orders is equal.
*
*      This increases the benefit of n-ary NLJ for star joins.
*
*
* 2.   Identifying which binary-joins need to be coalesced into n-ary
*      joins.
*
*      This is implemented in the method CgpNlJoin::cgpCodeGenTryNaryNLJ().
*      This method is called from CgpNlJoin::cgpCodeGen(), which code
*      generates a NLJ pop (pop = physical operator) coming from the
*      optimizer. This method tries to see if a n-ary NLJ lava operator can
*      can be generated. It also identifies which pops contribute to the
*      children of the n-ary NLJ lava operator to be code generated.
*
* 3.   Tracking predicate dependencies of a scan operator.
*
*      This is implemented in CgScanNaryNLJ class. This class tracks the
*      predicate dependencies of a scan operator that is a child of the
*      n-ary NLJ.
*
* 4.   Use of CgScanNaryNLJ class methods during the code generation of
*      Scan operators.
*
*      This is implemented by passing an additional parameter of type
*      CgScanNaryNLJ * to several methods involved in the code generation
*      of scan operator, such as
*      — cgpCodeGen methods of the CgpScan class (which corresponds to scan
*           Pop) and its subclasses.
*      — CgGenLava::CGConsScanOp method
*      — CgLavaUtils::CgCompileSargs(), CgLavaUtils::_CgCompileOnePred(),
*        and CgLavaUtils::CgCompilePred() method which compile the sargable
*        and non-sargable predicates for the scan operator. As they compile
*        the predicates, for each predicate dependency encountered, the
*        method CgScanNaryNLJ::CsnAddDependency() is called to track all
these
*        dependencies.
*
* 5.   A new lava execution operator n-ary NLJ
*
*      This is implemented in LeNaryNLJOp class.
*
* 6.   Access methods changes
*
*      Access methods needs to track how many sargs have been used. A new
*      field sdes—>sfailsargp has been added for this purpose. A macro
*      SCAN_UPDATE_NUMSARGSUSED has been added. This macro is called by
*      access methods for each row after the row is checked for sarg
*      satisfiability.
*/
class LeNaryNLJContext : public LeOpContext
{
        friend class LeNaryNLJOp;
        /**
         * Constructor for LeNaryNLJContext class. Note that this class
         * has the 'standard prototype' recommended for the constructors
         * of all operator context classes in lavaexec.pkg.
         *
         * @param LeNaryNLJOp *       Pointer to the n-ary NLJ operator
         *
         * @param LePlanFragContext * Pointer to plan fragment context
         *
         */
        SYB_INLINE
        LeNaryNLJContext(LeNaryNLJOp *, LePlanFragContext *);
private:
        int _LeNcNextChild;
};
class LeNaryNLJOp : public LeNaryOp
{
public:
        /**
         * Constructor for LeNaryNLJOp class.
```

APPENDIX A-continued

SOURCE CODE LISTINGS

```
         *
         * @param LeVirtAddr        Virtual Address for this operator
         *
         * @param int        Number of children
         *
         * @param LeOperator **    Array of child operators
         *
         * @param PROC_HDR *  Pointer to proc header
         */
        SYB_INLINE
        LeNaryNLJOp(LeVirtAddr, int, LeOperator **, PROC_HDR *);
        /**
         *    Open method for LeNaryNLJOp operator
         *
         * @returns LRET_SUCCESS
         */
        LeRetnCode __LeOpOpen();
        /**
         *    Next method for LeNaryNLJOp operator
         *
         * @returns LRET_SUCCESS or LRET_ENDOFSCAN
         */
        LeRetnCode __LeOpNext();
        /**
         *    Close method for LeNaryNLJOp operator
         *
         * @returns LRET_SUCCESS
         */
        LeRetnCode __LeOpClose();
        /**
         *    Acquire method for LeNaryNLJOp operator
         *
         * @returns LRET_SUCCESS
         */
        LeRetnCode __LeOpAcquire();
        /**
         *    Release method for LeNaryNLJOp operator
         *
         * @returns LRET_SUCCESS
         */
        LeRetnCode __LeOpRelease();
        /**
         *    Print method for LeNaryNLJOp operator
         */
        void LeOpPrint() const;
        /**
         *    Show plan method for LeNaryNLJOp operator
         */
        void __LeOpShowOp(int);
private:
};
# include <port.h>      /* this MUST be first */
extern "C"
{
# include <syb_std.h>
# include <dtypes.h>
# include <server.h>
# include <datetime.h>
# include <object.h>
# include <session.h>
# include <catalog.h>
# include <trees.h>
# include <exec.h>
# include <decision.h>
# include <tokens.h>
# include          <evaltable.h>
# include <tokenop.h>
# include          <lock.h>
# include          <lockmgr.h>
# include <exception.h>
# include <translate.h>
# include <loginrec.h>
# include <foucvt.h>
# include <pss.h>
# include <tds.h>
# include <constraint.h>
# include <rgb_map.h>
```

APPENDIX A-continued

SOURCE CODE LISTINGS

```
# include <derror.h>
# include <planerr.h>
# include <wtmgr.h>
# include <spinlock.h>
include 
include <index.h>
# include <css.h>
# include <trace.h>
# include <derror.h>
# include <bitbyte.h>
# include <resource.h>
# include <stat_public.h>
# include          <le_operator.h>
# include <le_showplan.h>
}
# include <le_operator.hpp>
# include <le_nljop.hpp>
# include <le_scanop.hpp>
# include <le_narynljop.hpp>
# include <le_planfragcontext.hpp>
#ifndef USE_INLINE
#include <le_narynljop.icpp>
#endif
//
// LeNaryNLJOp::_LeOpAcquire
//       Acquire method for LeNaryNLJOp operator.
//
// Returns
//       LRET_SUCCESS
//
LeRetnCode
LeNaryNLJOp::_LeOpAcquire()
{
        LeNaryNLJContext    *pContext;
        int                 Arity;
        LeRetnCode          Ret;
        Arity = LePoGetArity();
        for (int i = 0; i < Arity; i++)
        {
            Ret = LePoGetNthChild(i)—>LeOpAcquire();
            SYB_ASSERT(Ret == LRET_SUCCESS);
        }
        LE_OP_ALLOC_OPCONTEXT(pContext, LeNaryNLJContext);
        return LRET_SUCCESS;
}
//
// LeNaryNLJOp::_LeOpOpen
//       Open method for LeNaryNLJOp operator.
//
// Returns
//       LRET_SUCCESS
//
LeRetnCode
LeNaryNLJOp::_LeOpOpen()
{
        LeRetnCode          Ret;
        LeNaryNLJContext    *pContext;
        // Just open the first child.
        Ret = LePoGetNthChild(0)—>LeOpOpen();
        SYB_ASSERT(Ret == LRET_SUCCESS);
        pContext = (LeNaryNLJContext *)LeOpGetOpContext();
        pContext—>_LeNcNextChild = 0;
        return LRET_SUCCESS;
}
//
// LeNaryNLJOp::_LeOpNext
//       Next method for LeNaryNLJOp operator.
//
// Returns
//       LRET_SUCCESS or LRET_ENDOFSCAN
//
LeRetnCode
LeNaryNLJOp::_LeOpNext()
{
        LeRetnCode          Ret;
        LeNaryNLJContext    *pContext;
        int                 Arity;
```

APPENDIX A-continued

SOURCE CODE LISTINGS

```
LeOperator          *pChildOp;
LeScanOp            *pScanOp;
int                 i, Nexti;
SYB_BOOLEAN         NoMatch;
Arity = LePoGetArity();
pContext = (LeNaryNLJContext *)LeOpGetOpContext();
// This variable tracks if the ith child (i.e current child) returned
// empty result set.
NoMatch = FALSE;
for (i = pContext—>__LeNcNextChild; i < Arity;)
{
    // Do LeOpNext on ith Child.
    pChildOp = LePoGetNthChild(i);
    Ret = pChildOp—>LeOpNext();
    if (Ret == LRET_ENDOFSCAN)
    {
        // No match. Find which child to do next on.
        if (i == 0)
        {
            // No more rows from first child!
            goto end_of_scan;
        }
        pScanOp = pChildOp—>LeIsScanOp();
        if (pScanOp && NoMatch)
        {
            // This child is a scan op and it did not
            // return any rows. In this case, use
            // LeSoGetSkipBranchNum to find out the
            // next child to do LeOpNext() on.
            Nexti = pScanOp—>LeSoGetSkipBranchNum(i);
# if SANITY
            if (TRACE(DECISION, 43) && (Nexti < i - 1))
            {
                TRACEPRINT("NLJ jump %d to %d\n",
                    i, Nexti);
            }
# endif
        }
        else
        {
            // In this case, the next LeOpNext() is done
            // on (i-1)th child.
            Nexti = i - 1;
        }
        SYB_ASSERT(Nexti >= -1);
        // Close all children from i thru Nexti.
        for (int j = i; j > Nexti; j--)
        {
            pChildOp = LePoGetNthChild(j);
            Ret = pChildOp—>LeOpClose();
            SYB_ASSERT(Ret == LRET_SUCCESS);
        }
        // Since we are about to alter i, 'NoMatch' should
        // be reset.
        NoMatch = FALSE;
        i = Nexti;
        if (Nexti < 0)
        {
            // This is a special case, where a conjunct
            // that is not dependent on ANY of the
            // preceding branches failed. An example is
            // when a predicate involving user constant
            // failed. In this case, we can terminate
            // the join!
            goto end_of_scan;
        }
        continue;
    }
    // If not end of scan, it must be success. All errors
    // through exceptions.
    SYB_ASSERT(Ret == LRET_SUCCESS);
    // Since this scan returned a row, set NoMatch to FALSE
    NoMatch = FALSE;
    // Now we are ready to open next child.
    if (i == Arity - 1)
    {
        // We found the row to return;
```

APPENDIX A-continued

SOURCE CODE LISTINGS

```
                goto row_return;
            }
            i = i + 1;
            pChildOp = LePoGetNthChild(i);
            Ret = pChildOp—>LeOpOpen();
            SYB_ASSERT(Ret == LRET_SUCCESS);
            // ith child has not returned any rows so far.
            NoMatch = TRUE;
        }
end_of_scan:
        pContext—>_LeNcNextChild = i;
        return LRET_ENDOFSCAN;
row_return:
        pContext—>_LeNcNextChild = i;
        return LRET_SUCCESS;
}
//
// LeNaryNLJOp::_LeOpClose
//      Close method for LeNaryNLJOp operator.
//
// Returns
//      LRET_SUCCESS
//
LeRetnCode
LeNaryNLJOp::_LeOpClose()
{
        int             Arity;
        LeRetnCode      Ret;
        Arity = LePoGetArity();
        for (int i = 0; i < Arity; i++)
        {
            Ret = LePoGetNthChild(i)—>LeOpClose();
            SYB_ASSERT(Ret == LRET_SUCCESS);
        }
        return LRET_SUCCESS;
}
//
// LeNaryNLJOp::_LeOpRelease
//      Release method for LeNaryNLJOp operator.
//
// Returns
//      LRET_SUCCESS
//
LeRetnCode
LeNaryNLJOp::_LeOpRelease()
{
        int             Arity;
        LeRetnCode      Ret;
        Arity = LePoGetArity();
        for (int i = 0; i < Arity; i++)
        {
            Ret = LePoGetNthChild(i)—>LeOpRelease();
            SYB_ASSERT(Ret == LRET_SUCCESS);
        }
        return LRET_SUCCESS;
}
//
// LeNaryNLJOp::LeOpPrint
//
//      The print method for the LeNaryNLJOp operator.
//
// @Parameters:
//
// @Returns:
//
// @Side-effects:
//      Calls LeOpPrint method on children.
//
//
void
LeNaryNLJOp::LeOpPrint() const
{
        int     N;
        N = LePoGetArity();
        TRACEPRINT("===== NaryNLJoinOp with Arity = %d ======\n", N);
        for (int i = 0; i < N; i++)
        {
```

APPENDIX A-continued

SOURCE CODE LISTINGS

```
            LePoGetNthChild(i)—>LeOpPrint();
        }
}
//
//      LeNaryNLJOp::_LeOpShowOp()
//
//      Printing out the guts of the LeNaryNLJOp and call the child
//          _LeOpShowOp.
//
//      Parameters:
//          int levelOfChild, level of child from the root.
//
//      Side Effects:
//
//      Returns:
//
void
LeNaryNLJOp::_LeOpShowOp(int levelOfChild)
{
        int    N;
        char indt_buf[SHORTTEXT];
        N = LePoGetArity();
        /* LAVA_RESOLVE:
        **  Need to replace TRACEPRINT to ex_callprint()
        **  and add more infomation to show off.
        */
        le_sPlanGetIndent(levelOfChild, indt_buf);
        TRACEPRINT("%s%s Operator with arity %d\n",
                indt_buf, LE_N_NARYNLJOP, N);
        /* Call the Child LeOpShowOp() */
        for (int i = 0; i < N; i++)
        {
            LePoGetNthChild(i)—>LeOpShowOp(levelOfChild);
        }
}
SYB_INLINE
LeNaryNLJContext::LeNaryNLJContext(LeNaryNLJOp *, LePlanFragContext *)
{
        _LeNcNextChild = 0;
}
SYB_INLINE
LeNaryNLJOp::LeNaryNLJOp(LeVirtAddr VA, int NumChildren,
        LeOperator **ppChildOps, PROC_HDR *pPhdr)
        : LeNaryOp(VA, ppChildOps, NumChildren, pPhdr)
{
}
```

What is claimed is:

1. In a database system for representing information in database tables and for retrieving information from database tables in response to database queries, each database table comprising data records storing information categorized into one or more database columns, each database column storing information as an attribute having a particular data type, a method for processing a database query specifying a join of three or more tables, the method comprising:

in response to receiving a particular database query specifying a join of three or more tables, determining a join order for examining the tables during query processing, wherein said particular database query specifies selection criteria including at least one join condition that must exist between an inner table and an outer table that is not a directly preceding table in the join order;

retrieving rows from successive tables per the join order, including:

determining whether a join condition that is being tested refers back to a more-outer table that is not a directly preceding table, if the join condition is not met, fetching the next row, if any, from said more-outer table whose just-tested condition failed, and if the join condition is met, continuing down the join order to examine any subsequent tables in the join order, if any, applying any subsequent query conditions, if any, that must be met in order to qualify for the query; and in the instance that a set of rows under examination meets said selection criteria, qualifying those rows as having satisfied the particular database query.

2. The method of claim 1, wherein said join order specifies a particular order for retrieving rows from the tables for examination during query execution.

3. The method of claim 2, wherein the rows retrieved for examination are retrieved from a particular sequence of the database tables.

4. The method of claim 2, wherein the rows retrieved for examination includes at least some rows retrieved from an index for one of the database tables.

5. The method of claim 1, wherein said particular database query comprises an SQL-based query from a client database application.

6. The method of claim 1, wherein those rows that are qualified as having satisfied the selection criteria are returned as a query result.

7. The method of claim 1, wherein said step of retrieving rows is performed by accessing successive tables per the join order.

8. The method of claim 1, wherein said step of retrieving rows is performed using nested loop join technique.

9. The method of claim 1, wherein, when the join condition is not met, subsequent comparisons for the join condition are eliminated.

10. The method of claim 1, further comprising: when the join condition is not met, storing information in a scan descriptor that indicates why the condition is not met.

11. The method of claim 10, wherein the information stored in the scan descriptor includes information indicating that a particular search argument failed during testing of the join condition.

12. The method of claim 1, wherein the join condition tests for equality between two values.

13. The method of claim 1, wherein the join condition tests for inequality between two values.

14. The method of claim 1, wherein the join condition compares two fields from the tables.

15. An improved method for performing nested loop join query execution for a database query received by a database system, said query execution including examination of values from rows retrieved from successive tables pursuant to a join order, the improvement comprising:

determining that the database query specifies a join of three or more tables, where at least one join condition exists between an inner table and an outer table that is not a directly preceding table in the join order;

while performing query execution using nested loop join technique, if a join condition which is not met refers back to a more-outer table that is not a directly preceding table, fetching the next row, if any, from that more-outer table whose just-tested join condition failed;

if the join condition is met, continuing down the join order to examine any subsequent tables in the join order, if any, applying any subsequent query conditions, if any, that must be met in order to qualify for the query; and in the instance that a set of rows under examination meets all conditions of the database query, qualifying those rows as having satisfied the database query.

16. The improved method of claim 15, further comprising:

providing a scan descriptor for indicating why a particular join condition is not met.

17. The improved method of claim 16, wherein said scan descriptor allows determination of said more-outer table whose just-tested join condition failed.

18. The method of claim 15, wherein each join condition specifies a comparison of reference values retrieved from rows of the database tables.

* * * * *